Figure 1:
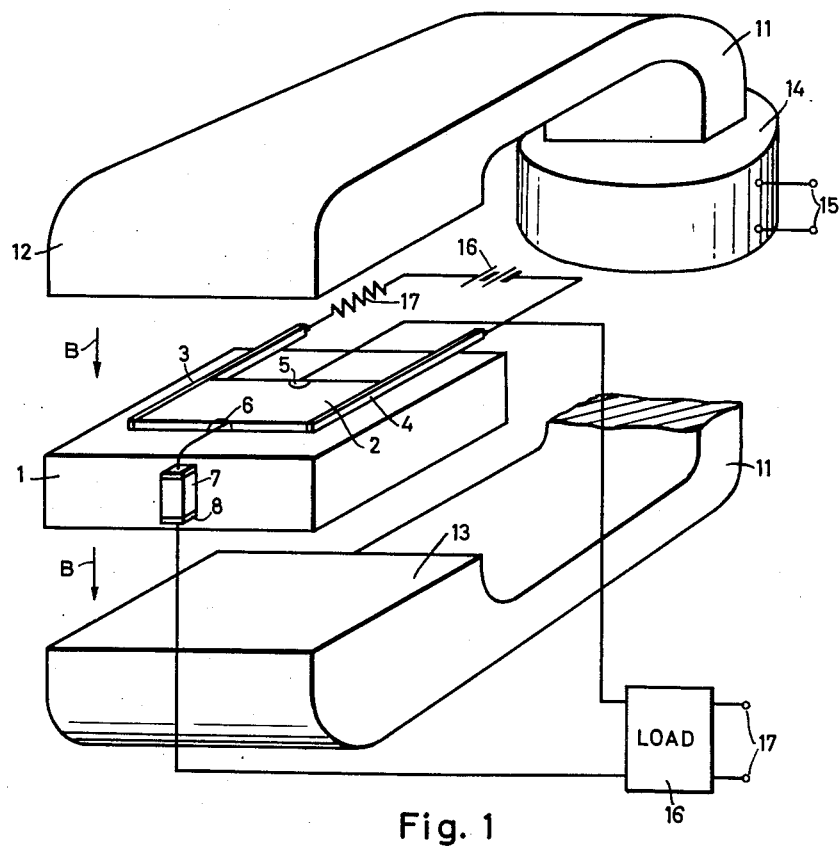

United States Patent Office 3,008,083
Patented Nov. 7, 1961

3,008,083
TEMPERATURE COMPENSATED HALL
VOLTAGE GENERATORS
Friedrich Kuhrt and Karl Maaz, Nurnberg, Germany, assignors to Siemens-Schuckertwerke Aktiengesellschaft, Berlin-Siemensstadt and Erlangen, Germany, a corporation of Germany
Filed Mar. 18, 1957, Ser. No. 646,798
Claims priority, application Germany Mar. 26, 1956
16 Claims. (Cl. 323—69)

Our invention relates to Hall voltage generators. Such devices have a magnetic field responsive resistance plate, preferably of semiconducting substance, provided with two current supply terminals and with two electrodes, the so-called Hall electrodes, which are spaced from each other and from the current supply terminals with such an orientation that the electrode spacing direction is perpendicular to the current-flow axis defined by the terminals. When no magnetic field is applied, the two Hall electrodes have the same electric potential; but when a magnetic field is effective upon the Hall-plate and has a field component perpendicular to the plane defined by the current-flow axis and the spacing direction of the electrodes, then the electric potentials of the respective electrodes become different so that a voltage, the so-called Hall voltage, is generated between them. The Hall voltage is essentially proportional to the product of the energizing current passing through the Hall plate and the intensity of the magnetic field and therefore it is available for measuring, controlling or regulating purposes in response to changes in the electric current or the magnetic field or both.

It is known that the Hall voltage of most Hall voltage generators varies in dependence upon temperature. For compensating such variations it has been proposed to connect a temperature-dependent resistor into the current-supplying circuit of the Hall-plate in parallel relation to the plate. The temperature-responsive changes in resistance then counteract the temperature dependence of the Hall generator so that the Hall voltage remains substantially unaffected. Such a temperature compensation, however, is obtained only when the magnetic field is kept constant. If the strength of the magnetic field varies, the Hall-plate changes its ohmic resistance and disturbs the current distribution so that a satisfactory temperature compensation is no longer obtained.

It is an object of our invention to provide Hall generators with a temperature compensating device whose accurate operation is independent of the strength of the magnetic field.

This is achieved, in accordance with a feature of our invention, by connecting a temperature-dependent resistor to the output or load circuit which extends across the Hall electrodes and is energized therefrom. The resistor thus connected with the electrode circuit of the Hall generator may either have a positive temperature coefficient of resistance in which case it must be connected parallel to the load in the Hall-electrode circuit, or it may consist of a resistance material having a negative temperature coefficient of resistance in which case it must be connected in series with the load.

According to another feature of the invention, the above-mentioned compensating resistor is located in the immediate vicinity of the Hall-plate, preferably in the same magnetic-field gap, and consists of a semiconducting compound. Particularly suitable for this purpose are intermetallic semiconducting compounds, preferably those of the type $A_{III}B_V$ consisting of a compound of an element A from the third group with an element B from the fifth group of the periodic system. These $A_{III}B_V$ compounds comprise: BN, BP, BAs, BSb, AlN, AlP, AlAs, AlSb, GaN, GaP, GaSb, InN, InP, InAs, InSb.

Temperature-dependent semiconductors consisting of the above-mentioned intermetallic compounds have a magnetic-field responsive resistance; that is, they change their ohmic resistance in dependence upon the intensity of a magnetic field to which they may be exposed. On the other hand it is desirable for the purpose of the invention to locate the compensating resistor in the same magnetic field as the Hall-plate of the Hall generator in order to obtain best possible temperature adaptation. For that reason, and in accordance with another feature of our invention, we prefer mounting the temperature-dependent resistance within the magnetic field of the Hall-plate with such an orientation that the current-flow direction within the compensating resistor coincides with the direction of the magnetic-field. As a result, the magnetic field dependence of the compensating resistance is practically zero.

Figure 2:
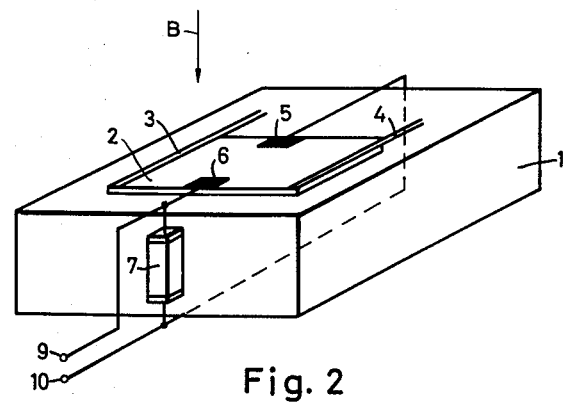

The above-mentioned and other objects and features of our invention will be more fully understood from the embodiments illustrated by way of example on the drawing and described hereinafter. On the drawing:

FIG. 1 shows schematically an exploded view of a Hall-generator provided with a temperature compensating resistor having a negative temperature coefficient of resistance; and FIG. 2 shows schematically the circuit diagram of an embodiment equipped with a temperature compensating resistor having a positive temperature coefficient of resistance.

According to FIG. 1 an insulating base plate 1, for instance of sintered ceramic material, carries a Hall plate 2 of semiconductor substance consisting preferably of one of the intermetallic compounnds mentioned above. Two opposite sides of the Hall plate 2 are provided with terminals 3 and 4 for passing an electric current through the plate substantially in a direction perpendicular to the direction of the magnetic field to which the Hall plate is exposed, the field direction being indicated by arrows B. The Hall plate 2 is provided with two electrodes 5 and 6 located between the current supply terminals and spaced from each other in a direction perpendicular to the direction of the magnetic field to which the Hall plate is exposed, the field direction being indicated by arrows B. The two electrodes 5 and 6 are also spaced from each other in a direction perpendicular to the current-flow axis. If the Hall plate 2 is made of an intermetallic semiconducting compound, preferably indium arsenide, its Hall constant and specific resistance are dependent upon temperature. Although this dependency is slight, it still has an appreciable disturbing effect upon the Hall voltage taken from across the electrodes 5 and 6. The Hall constant decreases with increasing temperature. The resistance, within the temperature range of up to about 150° C. of interest for most technical purposes, increases with increasing temperature. Both dependencies have the result that the Hall voltage across electrodes 5 and 6 decreases with increasing temperature when a load is placed into the Hall output circuit connected with the electrodes. This decrease in Hall voltage is compensated by a resistor 7 which is series connected in the Hall circuit and has a strongly negative temperature coefficient of resistance.

We have found that indium antimonide is a particularly advantageous material for the compensating resistor 7 because this compound has not only a favorable temperature coefficient but also a slight resistance and therefore can be given small dimensions. This makes it possible, as illustrated, to locate the compensating resistor in the immediate vicinity of the Hall plate 2, preferably so that the resistor is located in the field gap of the magnetizing field system together with the Hall plate. However, since indium antimonide, as well as other semiconducting compounds of the type $A_{III}B_V$, varies its specific resistance in dependence upon the magnetic field strength, the resistor 7 is so oriented that its current flow direction coincides with the direction B of the magnetic field. Accordingly, in FIG. 1 the elongated body of resistor 7 extends perpendicular to the plane of the Hall-plate wafer 2 and parallel to the direction B of the magnetic field. The strength of the magnetic field, therefore, has no effect upon the magnitude of the compensating resistance. The compensated output voltage of the Hall generator is taken from the Hall electrode 5 and the electrode 8 of the compensating resistor 7.

FIG. 1 also exemplifies schematically a magnetic field system for applying a variable magnetic field. The field system comprises a magnetizable core 11 and two pole shoes 12 and 13 whose respective pole faces extend parallel to the Hall plate 2 and are located as closely as possible to the Hall plate and the insulating support 1 respectively, although for the purpose of illustration the field structure is shown removed from plate 2 and support 1. The field structure is energized by a magnetizing coil 14 which receives excitation current from terminals 15. By varying the excitation current the strength of the magnetic field can be varied accordingly. In the illustrated example the current supply terminals 3 and 4 of the Hall plate 2 are shown connected to a current source 16 through a series resistor 17. As explained above, when the current flowing between terminals 3 and 4 is kept constant whereas the magnetic field strength is varied by varying the excitation current flowing through terminal 15, the output voltage between electrode 5 and resistor terminal 8 is substantially proportional to the magnetic field strength even if the Hall-generator output circuit is under current-consuming load, as represented by a load device 16 which may consist of the input stage of a magnetic amplifier whose output terminals are denoted at 17.

The embodiment illustrated in FIG. 2 is generally similar to that described above with reference to FIG. 1, the same reference characters being used for respectively similar components. In the device according to FIG. 2 the compensating resistor 7 has a positive temperature coefficient of resistance and is connected in the Hall-electrode circuit in parallel relation to the load. The material of the thermopositive resistor 7 consists preferably also of one of the above-mentioned intermetallic compounds. For instance, indium antimonide or indium arsenide are well suitable, it being understood that the concentration of lattice-defect impurities contained in the semiconducting substance and the dimensions of the resistor are so chosen that the compensating resistor possesses the desired positive temperature coefficient of resistance. When the temperature increases, the resistor 7 connected across the Hall electrodes 5 and 6 prevents the occurrence of a drop in Hall voltage so that the output voltage, available between the terminals 9 and 10, is properly compensated. The compensating thermo-positive resistor 7 according to FIG. 2 is also located in the magnetic field gap with such an orientation that the current flow direction in the resistor coincides with the direction B of the magnetic field lines.

As mentioned, basically the same intermetallic semiconductor compound can be used for a thermo-negative resistor according to FIG. 1 and for a thermo-positive resistor as described with reference to FIG. 2. This is due to the fact that the resistance-temperature characteristic of such compounds has an ascending and hence positive portion at lower temperatures and a descending and hence negative portion at higher temperatures so that for any given operating and temperature conditions a resistor of similar material, properly dimensioned, can be made to operate with a negative temperature coefficient or a positive temperature coefficient as may be desired. The following specific example, more fully described in the copending application of H. Welker and H. Weiss, Serial No. 642,448, filed February 26, 1957 for Power-Current Thermistors, assigned to the assignee of the present invention may serve as an illustration.

A resistance body of InAs of given dimensions doped with two $2 \times 10^{17}$ zinc atoms per cm.$^3$, to act as acceptor impurity, exhibited a resistance which, starting from a temperature of 0° C., increased up to a maximum resistance of approximately 140 ohms at a critical temperature in the neighborhood of 100° C. With a further increase in temperature the resistor body reduced its resistance to below 40 ohms at a temperature of approximately 175° C. It is apparent that when such a body is so dimensioned that during the normal operating range of the Hall generator the resistor temperature stays below the critical value of about 100° C., the resistor has a positive temperature coefficient of resistance, whereas if the resistor body is dimensioned to be heated above 100° C. during normal operation, its temperature coefficient is negative. Aside from the dimensions, which determine the heat capacity and heat dissipation of the resistor body, the critical temperature at which the temperature coefficient changes from positive to negative also depends upon the concentration of the lattice-defect impurity atoms. For instance when the same InAs substance is doped with a smaller amount of zinc atoms, for instance $5 \times 10^{16}$ atoms per cm.$^3$, the critical temperature is lower; and when the impurity concentration is increased above $2 \times 10^{17}$ atoms per cm.$^3$ the critical temperature is raised. For that reason a relatively high impurity concentration is desirable in a semiconducting compensating resistor to be used according to the invention if the resistor is to have a positive temperature coefficient according to the embodiment of FIG. 2, whereas a smaller concentration of the impurity atoms is preferable for a resistor to operate in the thermo-negative range according to the embodiment of FIG. 1.

Suitable techniques of preparing, purifying and doping the above-mentioned semiconducting resistance materials need not be described herein as they are well known for such purposes in general. In this respect reference may be had to the contribution by H. Welker and H. Weiss, entitled "Group III–Group V Compounds," to the book "Solid State Physics," volume 3, edited by F. Seitz and D. Turnbull, published 1956 by Academic Press Inc., New York.

We claim:

1. A Hall voltage generator comprising a magnetic field structure having a field gap, insulating support structure, a Hall plate carried by said support structure in said gap, said plate having two current supply terminals spaced from each other in a direction transverse to that of said field in said gap, and said plate having two Hall electrodes spaced from each other on said plate in a direction perpendicular to that of said field and perpendicular to the spacing direction of said terminals, an electric load circuit connected across said electrodes to be energized therefrom, and means for compensating for temperature dependent variations in the Hall voltage of the generator, said means comprising a semiconducting resistor consisting of an intermetallic compound and connected with said load circuit, said resistor having a specific resistance dependent upon its temperature and upon the strength of a magnetic field in which it is situated, the resistor being carried by said insulating support structure in said gap and having a current-flow axis parallel to the direction of said magnetic field, the resistor having its junctions in electrical connection with each of the Hall electrodes respectively.

2. In a Hall voltage generator having a magnetic field structure for providing a variable field and a semi-conducting Hall plate disposed transversely of said magnetic field, current supply terminals spaced from each other on said plate, and two Hall electrodes spaced from each other on said plate in a direction transverse to said magnetic field and to the spacing direction of said terminals, and Hall electrode circuit means connected to said Hall electrodes to receive Hall voltage therefrom, the improvement comprising a device for compensating for temperature dependent variations in the Hall voltage of the generator, said device comprising a temperature-dependent resistor connected with said Hall electrode circuit, the resistor having its junctions electrically connected to each of the Hall electrodes respectively, the resistor being formed of material the resistance of which is magnetic-field responsive, structure means for mounting said resistor in proximity to said Hall plate so as to be exposed to said magnetic field and in position such that the current flow direction therein is substantially parallel to the direction of said magnetic field.

3. In a Hall voltage generator having a magnetic field structure and a semiconducting Hall plate disposed transversely of said magnetic field, said Hall plate having a resistance that increases with increase in temperature, current supply terminals spaced from each other on said plate, and two Hall electrodes spaced from each other on said plate in a direction transverse to said magnetic field and to the spacing direction of said terminals, and a load circuit connected across said Hall electrodes to be energized therefrom, the improvement comprising a device for compensating for temperature dependent variations in the Hall voltage of the generator, said device comprising a temperature-dependent resistor having a resistance that decreases with increase in temperature in the operating range of the generator and having its junctions connected in series wtih said load circuit and both said Hall electrodes, the resistor being formed of material the resistance of which is magnetic-field responsive, structure means for mounting said resistor in proximity to said Hall plate so as to be exposed to said magnetic field and in position such that the current flow direction therein is substantially parallel to the direction of said magnetic field.

4. In a Hall voltage generator having a magnetic field structure and a thermo-negative semiconducting Hall plate disposed transversely of said magnetic field, current supply terminals spaced from each other on said plate, and two Hall electrodes spaced from each other on said plate in a direction transverse to said magnetic field and to the spacing direction of said terminals, and circuit means including a load means connected across said electrodes to be energized therefrom, the combination therewith of a device for compensating for temperature dependent variations in the Hall voltage of the generator, said device comprising a thermo-positive resistor formed of semiconductor material and connected in parallel to said load means and across both said Hall electrodes, the resistor being formed of material the resistance of which is magnetic-field responsive, structure means for mounting said resistor in proximity to said Hall plate so as to be exposed to said magnetic field and in position such that the current flow direction therein is substantially parallel to the direction of said magnetic field.

5. With a Hall voltage generator having magnetic field means for providing a variable magnetic field, a semiconducting Hall plate in the magnetic field of said means, two current supply terminals spaced from each other on said plate in a direction perpendicular to that of said field, and two Hall electrodes spaced from each other on said plate in a direction perpendicular to that of said field and perpendicular to the spacing direction of said terminals, and an electric load circuit connected across said Hall electrodes to be energized therefrom, the combination of a device for compensating for temperature dependent variations in the Hall voltage of the generator, said device comprising a temperature-dependent resistor formed of a semiconductor compound and connected with said load circuit in the vicinity of said plate so as to be exposed to said magnetic field, said resistor having a current flow direction parallel to the direction of said field, the resistor having its junctions electrically connected to each of the Hall electrodes respectively.

6. With a Hall voltage generator having magnetic field means for providing a variable magnetic field, a thermo-positive semiconducting Hall plate in the magnetic field of said means, two current supply terminals spaced from each other on said plate in a direction perpendicular to that of said field, and two Hall electrodes spaced from each other on said plate in a direction perpendicular to that of said field and perpendicular to the spacing direction of said terminals, and an electric load circuit connected across said Hall electrodes to be energized therefrom, the combination of a device for compensating for temperature dependent variations in the Hall voltage of the generator, said device comprising a temperature-responsive resistor constituted of a semiconducting compound taken from the group consisting of BN, BP, BAs, BSb, AlN, AlP, AlAs, AlSb, GaN, GaP, GaSb, InN, InP, InAs, InSb and having a resistance which is magnetic-field responsive, said resistor being connected with said load circuit and disposed in proximity to said Hall plate so as to be exposed to said magnetic field, said resistor having a current flow direction parallel to the direction of said field, the resistor having its junctions electrically connected to each of the Hall electrodes respectively, the resistor having a negative temperature coefficient of resistance and being connected in series with the load.

7. With a Hall voltage generator having magnetic field means, a semiconducting Hall plate in the magnetic field of said means, said Hall plate having a resistance that increases with increase in temperature, two current supply terminals spaced from each other on said plate in a direction perpendicular to that of said field, and two Hall electrodes spaced from each other on said plate in a direction perpendicular to that of said field and perpendicular to the spacing direction of said terminals, and an electric load circuit connected across said Hall electrodes to be energized therefrom, the combination of a device for compensating for temperature dependent variations in the Hall voltage of the generator, said device comprising a temperature-dependent resistor of indium antimonide connected with said load circuit in proximity to said Hall plate so as to be exposed to said magnetic field, said resistor having a current flow direction parallel to the direction of said field, the resistor having its junctions in electrical connection with each of the Hall electrodes respectively, the resistor having a negative temperature coefficient of resistance, and being connected in series with the load.

8. In a Hall voltage generator comprising a variable magnetic field structure having a field gap and a semiconducting Hall plate in said gap, said Hall plate having a resistance that increases with increase in temperature, constant direct current supply terminals spaced from each other on said plate in a direction transverse to that of the field, and two Hall electrodes spaced from each other on said plate in a direction transverse to that of the field and to the spacing direction of said terminals, and Hall electrode circuit means connected to said Hall electrodes to receive Hall voltage therefrom, the improvement comprising a temperature compensating device, the device comprising a temperature-dependent resistor of semiconductor material connected with said Hall electrode circuit, the resistor having its junctions electrically connected to each of the Hall electrodes respectively, the resistor having a negative temperature coefficient of resistance and being connected in series with the load, the resistor being formed of material the resistance of which is magnetic-field responsive, structure means for mounting said resistor in proximity to said Hall plate so as to be exposed to said magnetic field and in position such that the current flow direction therein is substantially parallel to the direction of said magnetic field.

9. In a Hall voltage generator comprising a variable magnetic field structure having a field gap and a semiconducting Hall plate in said gap, said Hall plate having a resistance that increases with increase in temperature, constant direct current supply terminals spaced from each other on said plate, and two Hall electrodes spaced from each other on said plate in a direction transverse to that of the field and to the spacing direction of said terminals, and a load circuit connected across said Hall electrodes to be energized therefrom, the improvement comprising a temperature compensating device, the device comprising a temperature-dependent resistor having its junctions connected in series with said load circuit and both said Hall electrodes, said resistor having a negative temperature coefficient of resistance, the resistor being formed of material the resistance of which is magnetic-field responsive, structure means for mounting said resistor in proximity to said Hall plate so as to be exposed to said magnetic field and in position such that the current flow direction therein is substantially parallel to the direction of said magnetic field.

10. In a Hall voltage generator comprising a variable magnetic field structure and a semiconducing Hall plate in said gap, said Hall plate having a resistance that decreases with increase in temperature, constant direct current supply terminals spaced from each other on said plate, and two Hall electrodes spaced from each other on said plate in a direction transverse to that of the field and to the spacing direction of said terminals, and circuit means including a load means connected across said electrodes to be energized therefrom, the improvement comprising a temperature compensating device, the device comprising a resistor disposed in proximity to said Hall plate and having its junctions connected in parallel to said load means, the resistor having a positive temperature coefficient of resistance, the resistor being formed of material the resistance of which is magnetic-field responsive, a structure means for mounting said resistor in proximity to said Hall plate so as to be exposed to said magnetic field and in position such that the current flow direction therein is substantially parallel to the direction of said magnetic field.

11. With a Hall voltage generator having a magnetic field means, a semiconducting Hall plate in the magnetic field of said means, two current supply terminals spaced from each other on said plate in a direction perpendicular to that of said field, and two Hall electrodes spaced from each other on said plate in a direction perpendicular to that of said field and perpendicular to the spacing direction of said terminals, and an electric load circuit connected across said Hall electrodes to be energized therefrom, the combination of a device for compensating for temperature dependent variations in the Hall voltage of the generator, said device comprising a temperature-dependent resistor of indium arsenide connected with said load circuit in proximity to said Hall plate so as to be exposed to said magnetic field, said resistor having a current flow direction parallel to the direction of said field, the resistor having its junctions in electrical connection with each of the Hall electrodes respectively.

12. In a Hall voltage generator having a magnetic field structure for providing a variable field and a semiconducting Hall plate disposed transversely of said magnetic field, current supply terminals spaced from each other on said plate, and two Hall electrodes spaced from each other on said plate in a direction transverse to said magnetic field and to the spacing direction of said terminals, and Hall electrode circuit means connected to said Hall electrodes to receive Hall voltage therefrom, the improvement comprising a device for compensating for temperature dependent variations in the Hall voltage of the generator, said device comprising a temperature-dependent resistor connected with said Hall electrode circuit, the resistor having its junctions electrically connected to each of the Hall electrodes respectively, said Hall plate having a resistance that increases with increase in temperature, said resistor being a semiconductor body having a negative temperature coefficient of resistance and being series-connected in said load circuit and disposed in said magnetic field, said resistor having a current flow axis parallel to the direction of said field.

13. The generator defined in claim 11, the Hall plate being formed of a semiconductor material having a resistance that increases upon increase in temperature, said indium arsenide resistor being connected in series with the load and having a resistance that decreases with increase in temperature in the operating range of the generator.

14. The generator defined in claim 12, the Hall plate being formed of a semiconductor material having a resistance that decreases upon increase in temperature, in the operating range of the generator, said indium arsenide resistor being connected in parallel with the load and being doped so as to have a resistance that increases with increase in temperature in the operating range of the generator.

15. With a Hall voltage generator having magnetic field means for providing a magnetic field, a semiconducting Hall plate in the magnetic field of said means, said Hall plate having a resistance which decreases upon increase in temperature, two current supply terminals spaced from each other on said plate in a direction perpendicular to that of said field, and two Hall electrodes spaced from each other on said plate in a direction perpendicular to that of said field and perpendicular to the spacing direction of said terminals, and an electric load circuit connected across said Hall electrodes to be energized therefrom, the combination of a device for compensating for temperature dependent variations in the Hall voltage of the generator, said device comprising a temperature-responsive resistor constituted of a semiconducting compound taken from the group consisting of BN, BP, BAs, BSb, AlN, AlP, AlAs, AlSb, GaN, GaP, GaSb, InN, InP, InAs, InSb and having a resistance which is magnetic-field responsive, said resistor being connected with said load circuit and disposed in proximity to said Hall plate so as to be exposed to said magnetic field, said resistor having a current flow direction parallel to the direction of said field, the resistor having its junctions electrically connected to each of the Hall electrodes respectively, the resistor having a positive temperature coefficient of resistance and being connected in parallel with the load.

16. With a Hall voltage generator having magnetic field means, a semiconducting Hall plate in the magnetic field of said means, the Hall plate having a resistance which decreases with increase in temperature in the operating range of the generator, two current supply terminals spaced from each other on said plate in a direction perpendicular to that of said field, and two Hall electrodes spaced from each other on said plate in a direction perpendicular to that of said field and perpendicular to the spacing direction of said terminals, and an electric load circuit connected across said Hall electrodes to be energized therefrom, the combination of a device for compensating for temperature dependent variations in the Hall voltage of the generator, said device comprising a temperature dependent resistor of indium antimonide connected with said load circuit in proximity to said Hall plate so as to be exposed to said magnetic field, said resistor having a current flow direction parallel to the direction of said field, the resistor having its junctions in electrical connection with each of the Hall electrodes respectively, the resistor having a positive temperature coefficient of resistance and being connected in parallel with the load.

References Cited in the file of this patent

UNITED STATES PATENTS

| | | |
|---|---|---|
| 2,335,117 | Harrison | Nov. 23, 1943 |
| 2,536,806 | Hansen | Jan. 2, 1951 |
| 2,714,182 | Hewitt | July 26, 1955 |
| 2,736,822 | Dunlap | Feb. 26, 1956 |
| 2,751,550 | Chase | June 19, 1956 |
| 2,852,732 | Weiss | Sept. 16, 1958 |
| 2,855,549 | Kurht et al. | Oct. 7, 1958 |
| 2,924,759 | Maaz | Feb. 9, 1960 |